(12) United States Patent
Carter et al.

(10) Patent No.: US 6,201,611 B1
(45) Date of Patent: *Mar. 13, 2001

(54) PROVIDING LOCAL PRINTING ON A THIN CLIENT

(75) Inventors: Keith Edward Carter; Mark J Hamzy; Patrick Nogay; Mark Wayne VanderWiele, all of Austin, TX (US)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/974,418

(22) Filed: Nov. 19, 1997

(51) Int. Cl.[7] .................................................. G06F 15/00
(52) U.S. Cl. ...................... 358/1.15; 358/1.14; 358/1.13
(58) Field of Search ................................... 335/101, 114, 335/113, 112, 110, 115, 116, 117, 200; 358/1.15, 1.9, 1.12, 1.17, 1.6

(56) References Cited

U.S. PATENT DOCUMENTS

| | | | |
|---|---|---|---|
| 5,083,262 | 1/1992 | Haff, Jr. .................................. | 395/500 |
| 5,220,674 | 6/1993 | Morgan et al. ........................ | 395/800 |
| 5,467,434 | * 11/1995 | Hower, Jr. et al. ................... | 395/114 |
| 5,580,177 | 12/1996 | Gase et al. .............................. | 400/61 |
| 5,602,974 | 2/1997 | Shaw et al. ............................ | 395/114 |
| 5,638,497 | * 6/1997 | Kimber et al. ........................ | 395/114 |
| 5,699,495 | * 12/1997 | Snipp ..................................... | 395/114 |
| 5,825,991 | * 10/1998 | Plakosh et al. ....................... | 395/115 |
| 5,832,301 | * 11/1998 | Yamaguchi ........................... | 395/868 |
| 5,901,362 | * 5/1999 | Cheung et al. ....................... | 455/525 |
| 5,974,234 | * 10/1999 | Levine et al. ......................... | 395/114 |

FOREIGN PATENT DOCUMENTS

| | | | |
|---|---|---|---|
| 0738949A1 | 10/1995 | (EP) | ................. G06F/3/00 |
| 0738956A2 | 10/1995 | (EP) | ................. G06F/3/12 |

OTHER PUBLICATIONS

AutoGraph International Easy Copy/X Generic Drivers (http:/www.autograph.dk/htdocs/ecs/generic.htm).
IBM TDB (10/92,pp433–434) How AIX Server Replies Query of OS/2 Printer Device Driver Name.

* cited by examiner

Primary Examiner—Joseph Mancuso
Assistant Examiner—Douglas Tran
(74) Attorney, Agent, or Firm—Jeffrey S. Labaw

(57) ABSTRACT

A print rendering server system in a network computing environment perform many of the most compute intensive tasks in the overall print process for a plurality of resource limited clients. In response to a print request from the client, a print job in a print ready format is produced and sent back for local printing by the resource limited client system.

8 Claims, 4 Drawing Sheets

PROVIDING LOCAL PRINTING ON A THIN CLIENT

BACKGROUND OF THE INVENTION

The present invention generally relates to the field of a network of information handling systems. More particularly, it relates to a system and method for providing print support on a connected system with limited resources, sometimes referred to herein as a thin client.

It is well known to provide a printer coupled to a computer system as one means of providing a permanent record of the output of the computer system. However, as the number of printers with disparate interfaces as well as the number of different types of document formats have grown, full printer support in a typical computer environment has become complex. The designers of computer and printer hardware and software have attempted to insulate the application developer from the complexities of the environment as well as device specific attributes by the use of one or more printer drivers. While they have largely succeeded, the attendant demands of the printer drivers and associated software on system resources have grown quite large.

One of the recent efforts to decrease the cost of network computing is the development of network computers, or other "thin clients". These devices are characterized by a limited local system resources and a greater dependency on larger systems in the network than the present day personal computer.

Providing full function local print support on a connected system with limited resources is extremely difficult. The large amounts of random access memory and disk space required, as well as the needed processor speed, complicate the development of network computers. A typical printer driver requires one to two megabytes of disk space simply to be installed. When the driver is loaded along with the system components it requires, such as a spooling system, raster banding/journaling code, and a port driver, the printer driver can consume large amounts of system memory designated for code space. When the driver is rendering a print job, the printer driver can use one to sixty-four megabytes of data memory to rasterise the page. The techniques used to lower memory requirements such as banding complicate the driver and increase driver development time. Also, these techniques only trade processor and disk usage for memory usage. When the printer is in use, it is necessary to provide disk spooling. Depending on the size of the jobs, number of print jobs and printer languages used, the disk requirements of the spooling system can range from a few megabytes to hundreds of megabytes.

Clearly, these enormous requirements make providing reliable local print support on a thin or resource restricted client extraordinarily demanding.

In today's information handling systems local printing from systems with limited resources is either nonexistent, limited, complicated, or resource intensive. One prior solution is to not allow local printing on the thin client. This forces users of these systems to use server printing or manually upload files to another system for printing. This method does not provide the convenience of local printing.

Another prior method is to limit the scope and functionality of local printing by reducing the device support to a single or few simple devices, limiting spooling and/or restricting print capabilities, e.g., only printing text. This method is too restrictive for general use.

The most common prior solution has been to increase the resources on the thin clients that require local printing and render the print file on the client, much like the situation on a personal computer attached to a network. This method increases the cost and complexity of every system, defeating some of the cost saving benefits of network computing.

Thus, there is a need to provide an economical, full function local print function in a network computing environment.

SUMMARY OF THE INVENTION

Therefore, it is an object of the invention to provide local printing on a resource restricted client.

It is another object of the invention to avoid increasing the required resources at the client by the provision of local printing.

It is another object of the invention to print a full variety of documents at the local printer of a thin client.

It is another object of the invention to significantly reduce system resources normally devoted to local printing for use by other system tasks.

It is another object of the invention to support a variety of types of local printers which may located near or connected to a thin client.

It is another object of the invention to fully exploit the capabilities of local printers which may be connected to a thin client.

These and other objects are accomplished by using a print rendering server system to perform many of the most compute intensive tasks in the overall print process. A print job in a print ready format is produced and sent back for local printing by a resource limited client system.

The process begins at the client system, where a print request is received from a resident application for local printing. The print request is sent via a network to a print rendering server. At the print rendering server, the print request is rendered into a print job in a print ready format. The print job in the print ready format is sent back across the network to a printer local to the client system. Thus, the print job is printed at the local printer without devoting significant system resources at the thin client to a print subsystem.

BRIEF DESCRIPTION OF THE DRAWINGS

These objects, features and advantages will be more readily understood with reference to the attached figures and following description.

DETAILED DESCRIPTION OF THE DRAWINGS

The invention may be run on a variety of computers or collection of computers under a number of different operating systems. The computer could be, for example, a hand held computing device, a network computer a personal computer, a mini computer, mainframe computer or a computer running in a distributed network of other computers. Although the specific choice of computer is limited only by processor speed and disk storage requirements, computers in the IBM PC series of computers could be used in the present invention. One operating system which an IBM personal computer may run is IBM's OS/2 Warp 4.0. In the alternative, the computer system might be in the IBM RISC System/6000 (™) line of computers which run on the AIX (™) operating system. Other computers and operating systems are known.

Figure 1:
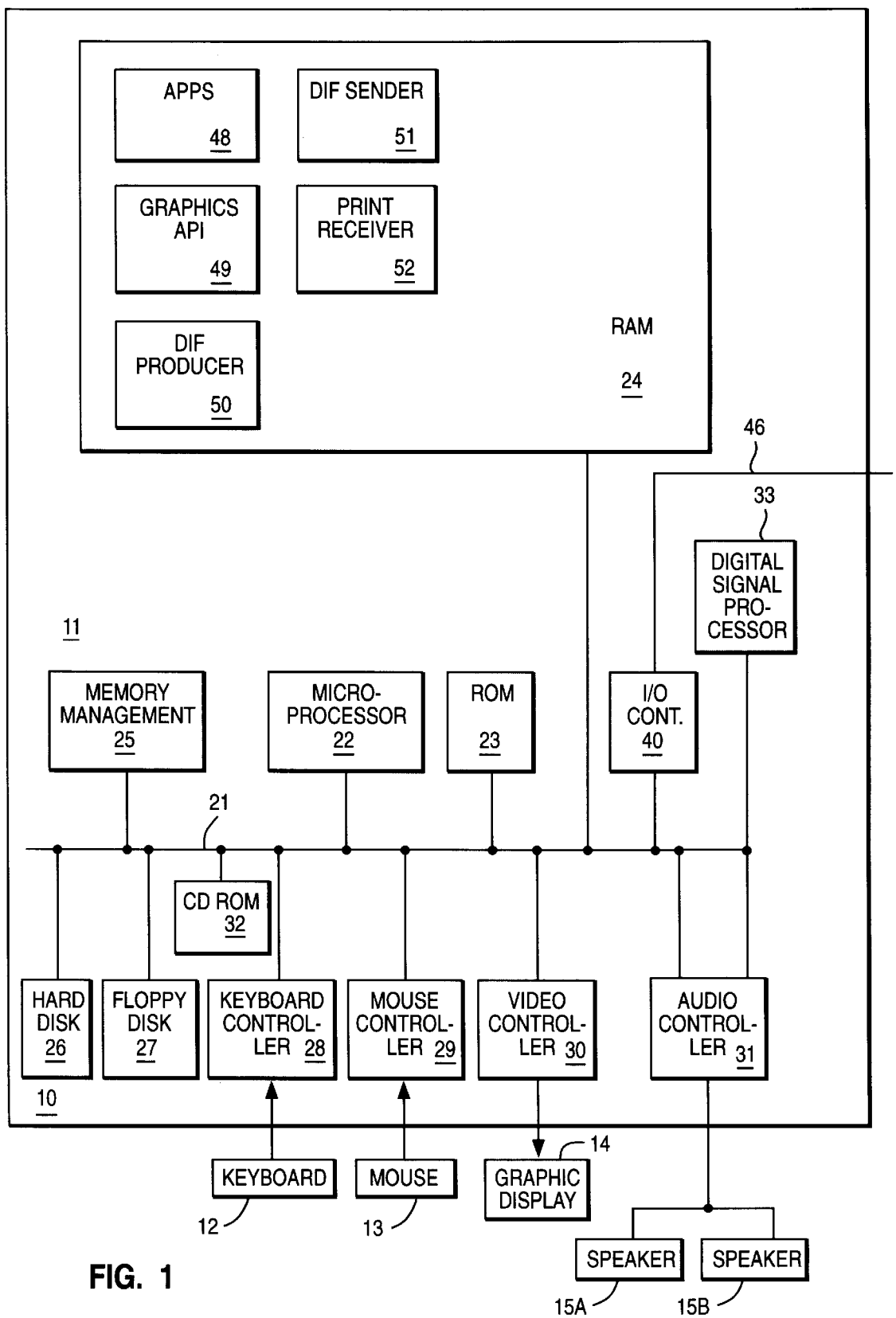
FIG. 1 depicts a computer system configured according to the teachings of the present invention.

In FIG. 1, a computer 10, comprising a system unit 11, a keyboard 12, a mouse 13 and a display 14 are depicted in block diagram form. The system unit 11 includes a system bus or plurality of system buses 21 to which various components are coupled and by which communication between the various components is accomplished. The microprocessor 22 is connected to the system bus 21 and is supported by read only memory (ROM) 23 and random access memory (RAM) 24 also connected to system bus 21. A microprocessor in the IBM PC series of computers is one of the Intel family of microprocessors including the 386, 486 or Pentium microprocessors. However, other microprocessors including, but not limited to, Motorola's family of microprocessors such as the 68000, 68020 or the 68030 microprocessors and various Reduced Instruction Set Computer (RISC) microprocessors such as the PowerPC chip manufactured by IBM. Other RISC chips made by Hewlett Packard, Sun, Motorola and others may be used in the specific computer.

The ROM 23 contains among other code the Basic Input-Output system (BIOS) which controls basic hardware operations such as the interaction of the processor and the disk drives and the keyboard. The RAM 24 is the main memory into which the operating system and application programs are loaded. The memory management chip 25 is connected to the system bus 21 and controls direct memory access operations including, passing data between the RAM 24 and hard disk drive 26 and floppy disk drive 27. The CD ROM 32 also coupled to the system bus 21 is used to store a large amount of data, e.g., a multimedia program or presentation.

Also connected to this system bus 21 are various I/O controllers: The keyboard controller 28, the mouse controller 29, the video controller 30, and the audio controller 31. As might be expected, the keyboard controller 28 provides the hardware interface for the keyboard 12, the mouse controller 29 provides the hardware interface for mouse 13, the video controller 30 is the hardware interface for the display 14, and the audio controller 31 is the hardware interface for the speakers 15. An I/O controller 40 such as a Token Ring Adapter enables communication over a network 46 to other similarly configured data processing systems.

One of the types of devices which would benefit from the invention is a wireless device such as a palmtop computer. While many of the components are similar to those described above for a personal computer, albeit smaller in size and capability, these devices are generally connected to a network by cellular or digital transmissions in the RF spectrum, rather than a coax or other type of cable. Other transmission means such as infrared or ultrasound are known to the art, but less commonly used. Further, some of these devices lack input devices such as a mouse and keyboard and possess others such as a touch sensitive input system.

One of the preferred implementations of the invention is as sets of instructions 48–52 resident in the random access memory 24 of one or more computer systems configured generally as described above. Until required by the computer system, the set of instructions may be stored in another computer readable memory, for example, in the hard disk drive 26, or in a removable memory such as an optical disk for eventual use in the CD-ROM 32 or in a floppy disk for eventual use in the floppy disk drive 27. Further, the set of instructions can be stored in the memory of another computer and transmitted in a computer readable medium over a local area network or a wide area network such as the Internet when desired by the user. One skilled in the art would appreciate that the physical storage of the sets of instructions physically changes the medium upon which it is stored electrically, magnetically, or chemically so that the medium carries computer readable information. While it is convenient to describe the invention in terms of instructions, symbols, characters, or the like, the reader should remember that all of these and similar terms should be associated with the appropriate physical elements.

Further, the invention is often described in terms that could be associated with a human operator. While the operations performed may be in response to user input, no action by a human operator is desirable in any of the operations described herein which form part of the present invention; the operations are machine operations processing electrical signals to generate other electrical signals.

Figure 2:
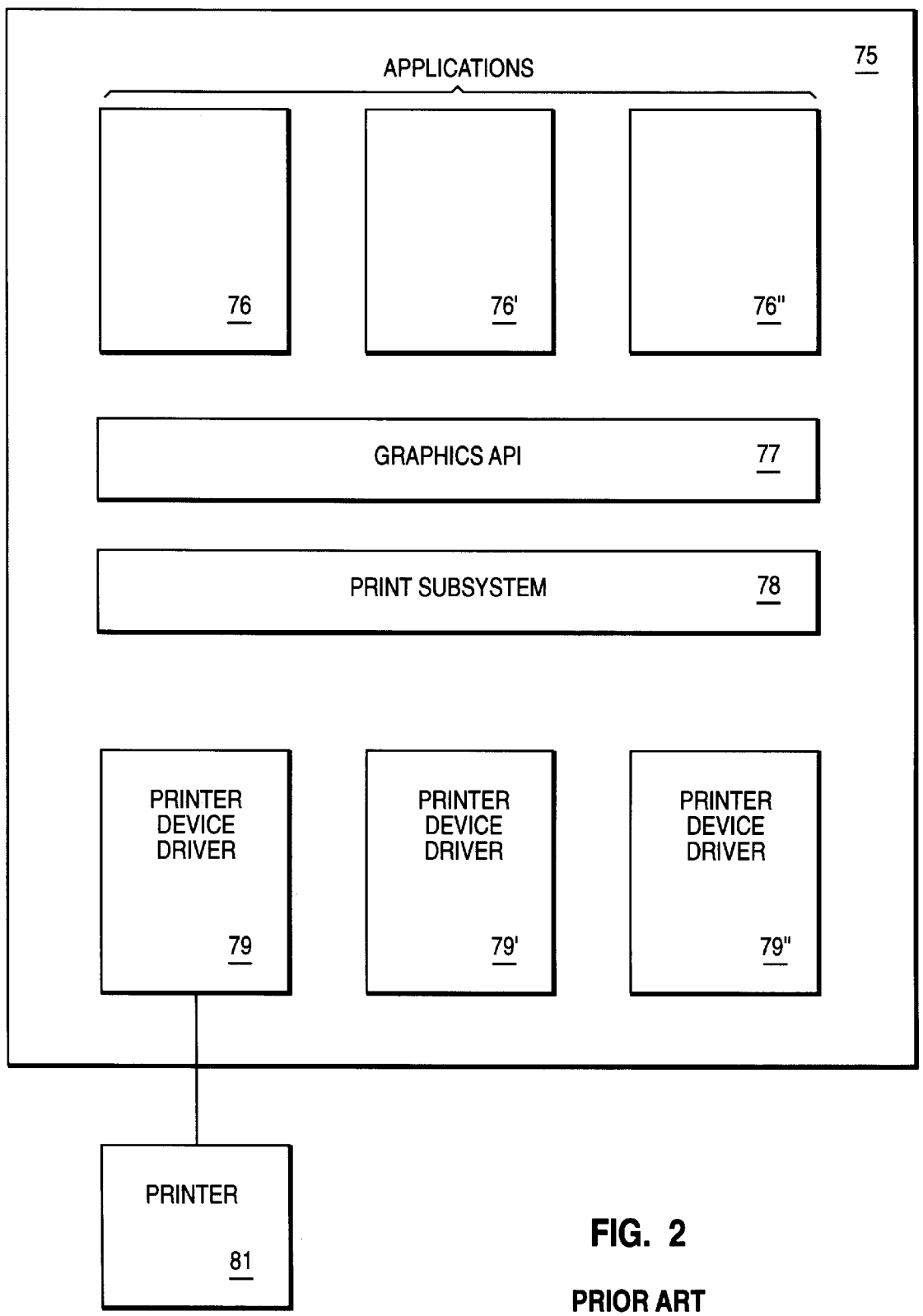
FIG. 2 is a block diagram of a prior art system depicting some of the software used for printing.

A representative configuration of a personal computer is shown in FIG. 2. This configuration shows some of the major software modules used in prior art printing methods. An application 76 makes a printing call to the graphics API layer 77 where the printing request is translated into a format understood by the print subsystem 78. A representative format understood by a print subsystem is the Graphics Object Content Architecture (GOCA) supported by the OS/2 Warp operating system. In general, the format for the print subsystem is unique to each operating system. The print subsystem 78 creates, spools and schedules a print job for the print request. The print job contains the information from the print request. The print subsystem 78 selects the correct device driver 79 for the target printer 81. The device driver 79 employs the job and printer properties to create and send a print job in a Print-Ready Format (PRF) to the printer.

This prior art architecture is disadvantageous for a thin client. As discussed in the background, the demands of the print subsystem 78 and printer drivers 79 can be enormous, particularly if numerous complicated print jobs are to be printed.

The present invention provides another solution. By using a print server to create the data streams for the wide variety of the printers in a network, including those attached to the thin client the major demands of the print system are moved to the server. Thus, the reoccurring investment in each thin client for print support is limited.

During initialization, the client only queries the print system on the server for default job and printer properties based on the device names for the printers at initial setup and stores them locally. The user can then modify these properties for their local printing through a user interface. During submission of a print job, the client sends the job and printer properties along with a device independent print file and client routing information to the server for transformation of the data into a device dependent data stream, called a print-ready format (PRF).

The server transforms the device independent print file data for the appropriate printer device using the job and printer properties submitted with the job and sends the data back to a small receiver on the client using the client routing information. For example, the client routing information can be an internet IP address.

The client paces off the server when the printer is busy to avoid local spooling and outputs the data to the local printer.

The client system allocates memory to hold print data from the server. The amount of memory allocated at the client is configurable. When the client fills the allocated memory with print data, the client stops receiving data from the server until some or all of the data in the memory is printed on the local printer. The client then resumes receiving data from the server.

Figure 3:
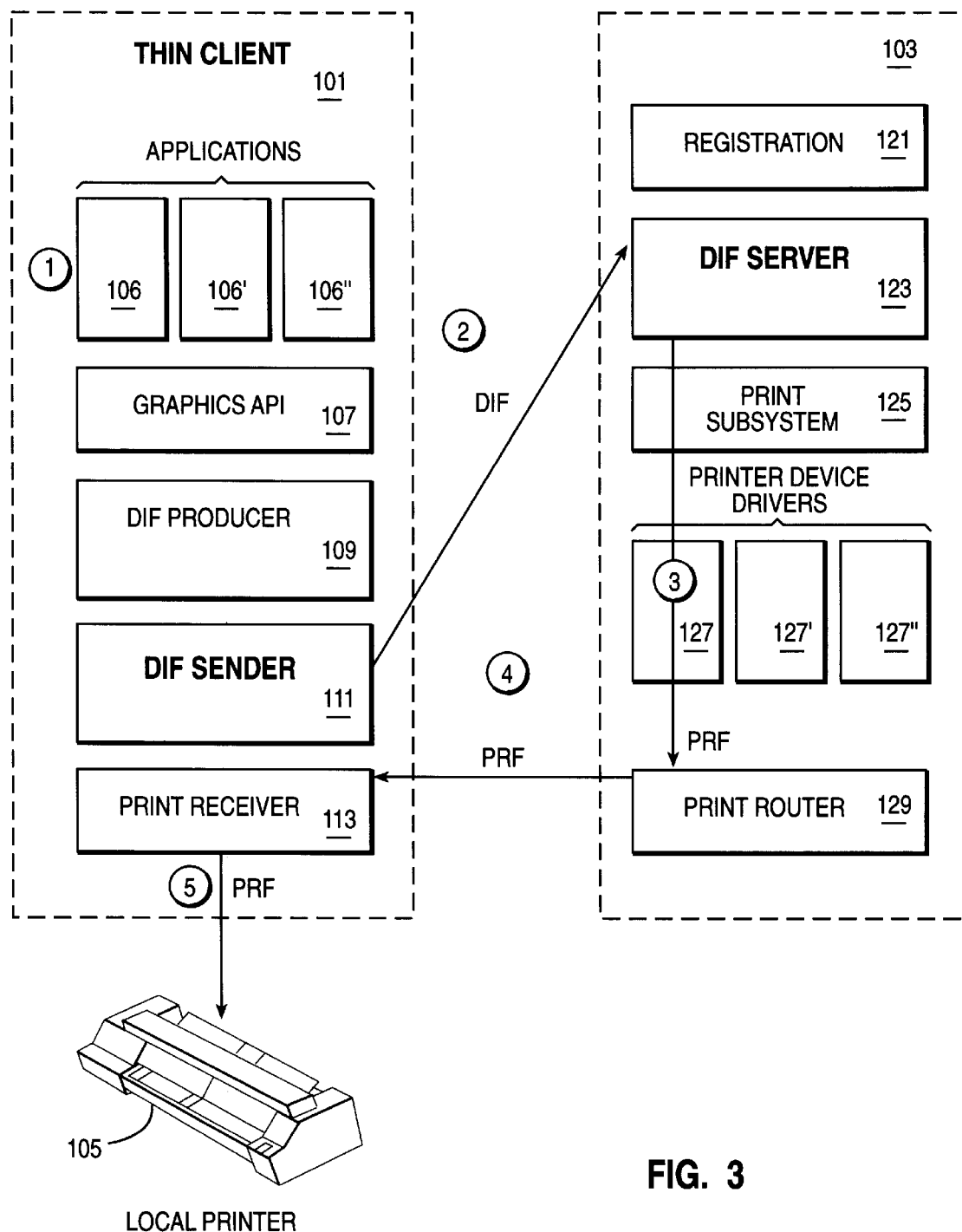
FIG. 3 is a block diagram of a thin client and server configured according to the present invention.

Referring now to FIG. 3, a thin client 101 is coupled by a network link 102 to a print rendering server 103. The network link 102 can be a hardware link such as the cables which comprise a local area network, e.g., token ring or ethernet, or an infrared, RF or microwave link. A thin client for the purposes of the invention is any network connected, even temporarily, client system with limited resources, or resources which the user does not choose to be devoted to print tasks. According to the invention, a thin client 101 may be preconfigured to use a primary print rendering server 103 or search a global directory to locate a primary print rendering server. For the sake of simplicity, the normal protocol stacks, network adapters and so forth used in network communications are not depicted although one skilled in the art would understand that they would also be present.

In the thin client 101, a set of applications 106, 106', 106" are resident. The user of the thin client can access these applications by means of the user interface of the computer and cause an application to issue one or more print requests. The graphics API 107 is a set of commands available to the applications for drawing text or graphics.

The DIF producer 109 is a component called by the graphics API layer 107 on the thin client that generates a device-independent format (DIF) data stream from the graphic APIs called by the applications. An example of a device independent print file is a Graphics Object Content Architecture (GOCA) metafile. Information on GOCA can be found in Graphics Programming Interface Programming Guide, Order No. G25H-7106-00, a publication of the IBM Corporation.

The DIF producer 109 passes the DIF data stream to the DIF sender 111. The DIF sender 111 sends the DIF data stream to a DIF server 123 at the print rendering server 103. The DIF data stream is accompanied by the job properties, printer properties, and routing information for the job.

The reader should note that the registration component 121 on the print rendering server 103 has prior to the initiation of the print request registered device rendering services with a global directory service using a protocol such as the Lightweight Directory Access Protocol (LDAP). The LDAP directory service can be used by thin clients to find an appropriate server to perform print rendering services. The print rendering server 103 uses the directory service to advertise the printers and printer driver which they support. Possibly, the IP address can be used by the client to choose among servers supporting the desired print drivers for the most proximate print rendering server.

The DIF server 123 accepts the device independent format data stream and uses the accompanying job properties, printer properties, and routing information to submit the job to the print subsystem 125 to generate a Print-Ready Format (PRF) data stream. The print subsystem 125 is a device driver which includes the components responsible for spooling and releasing print jobs. The printer device drivers 127, 127', 127" are components on print rendering server 103 capable of generating a Print-Ready Format(PRF) data stream. Examples of printer device drivers would be PostScript or PCL printer device drivers.

The print router 129 is a component on the print rendering server 103 which sends the Print-Ready Format (PRF) data stream to the destination specified in the routing information of the submitted print job, e.g., back to the thin client 101.

The print receiver component 113 on the thin client receives the Print-Ready Format (PRF) data stream and sends it to a locally attached printer 105. The print receiver component 113 contains an allocated memory monitor so that the PRF data stream is received in a controlled manner to avoid local spooling. In some embodiments of the current invention the print receiver may temporarily store data on another system. In some embodiments of the invention, the local printer is not actually attached to the particular thin client, but may be attached to a nearby thin client or a printer directly attached to the network. In these cases, the print receiver component 113 is not needed at the requesting thin client 101.

Figure 4:
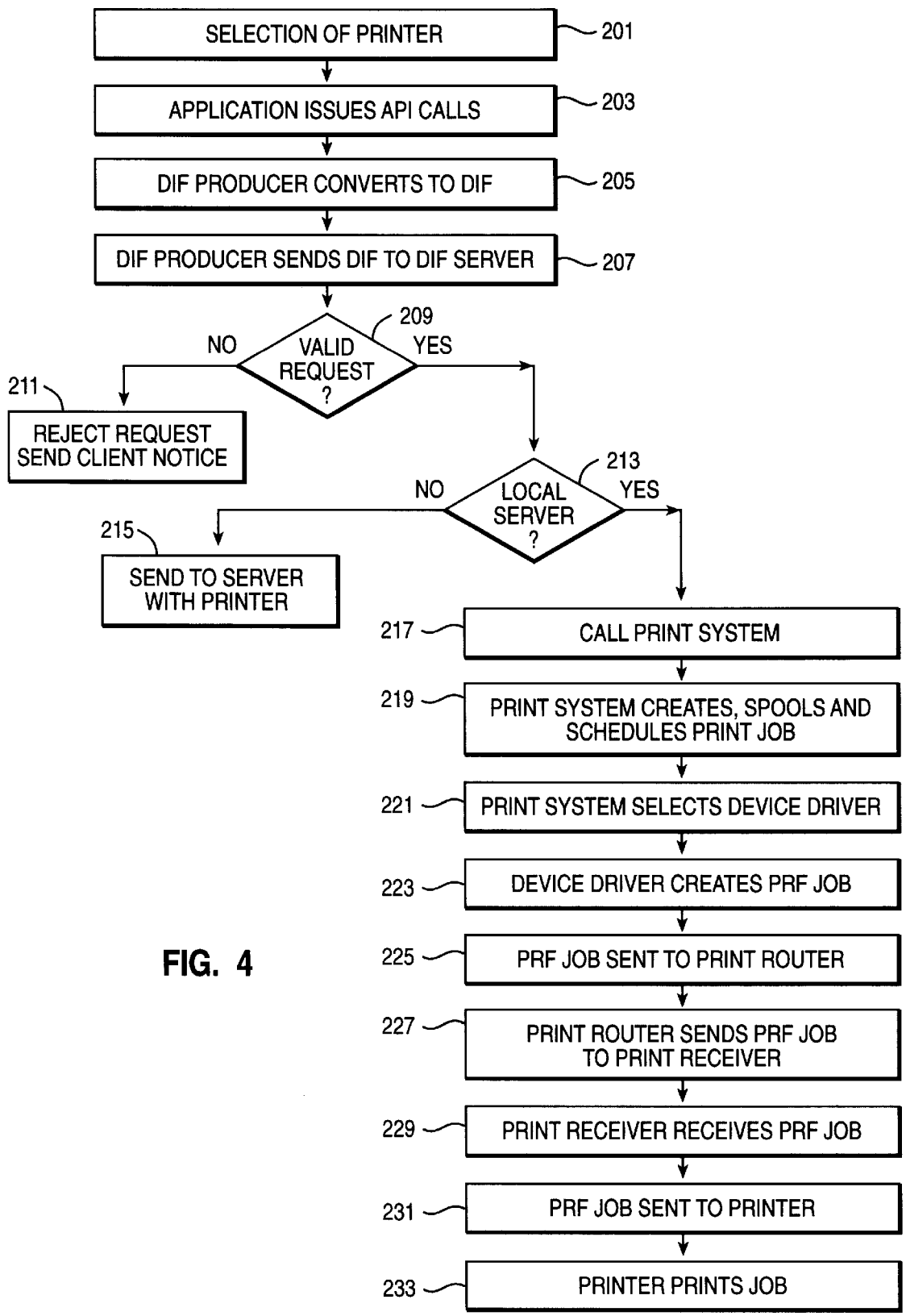
FIG. 4 is a flow diagram of the process of the present invention.

The process of printing a print job according to the present invention is further detailed with reference to the flow diagram of FIG. 4.

In an application on a thin client, an end-user selects a local printer, step 201, henceforth called the "target printer", to print information on that printer. The application then issues Graphics API calls to draw text and graphics to print the information on the target printer, step 203. Example Graphics API calls for OS/2 are GpiCharStringAt() to draw text and GpiPolygons() to draw polygons. Example graphics API calls for a Java graphics object are drawCharacters to draw text and drawpolygon to draw polygons.

The DIF producer converts these calls into a Device-Independent Format (DIF) in step 205. In the preferred embodiment, the conversion between the graphics API and the resultant DIF command is done via code and a lookup table used by the DIF producer. In step 207, the DIF producer sends a print request in device independent format to a DIF Server. This print request contains: (1) print options selected by the user to print the information, e.g., number of copies and orientation, henceforth called "job properties"; (2) the make and model of the target printer, henceforth called the "device id", e.g., "IBM Network Printer 12"; (3) device options for the target printer, e.g., amount of printer memory, henceforth called "printer properties"; (4) routing information that informs the server of the address of the target printer; and (5) the deviceindependent data, i.e. the DIF file created from the graphics API calls. The routing information and printer properties are passed with a print job to a print rendering server according to a print protocol known to the operating system. An example of a protocol could be a name-value pair such as: Protocol received by rendering server JOBNAME=Calendar Page, DATATYPE= DIF, ORIENTATION=PORTRAIT, MEMORY=4 MB, FORM=LETTER, ROUTEINFO=9.53,255,255.

In step 209, the DIF server validates the print request from the thin client and either rejects or accepts the print request. The DIF Server may reject the request if the DIF format is not supported or if the submitting client does not have the authority to submit jobs to the DIF Server. If either is the case, step 211, the DIF server rejects the request and sends the client a notice of the rejection.

If the server accepts the request, in step 213 the server uses the device id to determine if it supports the target printer or if another DIF Server supports the target printer. If the server supports the target printer, it processes the request. Otherwise, the server will issue a search by attribute on a global directory using a protocol such as the Lightweight Directory Access Protocol (LDAP) to find another DIF Server that supports the target printer. The server forwards the print request to that DIF Server, step 215.

The DIF server that supports the target printer then calls a print subsystem, step 217. The print subsystem creates, spools and schedules a print job for the print request. The print job contains the information from the print request, i.e. job properties, printer properties, routing information and DIF file. The print subsystem uses the device id to select the correct device driver for the target printer, step 221. The device driver uses the job and printer properties to create and send a print job in a Print-Ready Format (PRF), step 223. The device driver sends the PRF job to the print router, step 225. The PRF contains the commands and the data that the target printer uses to print the job. Postscript is an example of a PRF.

The print router uses the routing information in the print job to send the print job in the PRF to the print receiver on the thin client, step 227. The print receiver receives the print job with the PRF, step 231. Finally, the print receiver sends and prints the job on the target printer, step 233.

By using the relatively robust resources available at the print rendering server for the most compute and storage intensive tasks, the resources at each network computer devoted to printing can be limited. Yet the invention also allows the convenience of local printing, not available at most pure print server based solutions.

The invention is very flexible. By passing routing information with print job to the print rendering server, the server does not necessarily send print ready format back to the submitting thin client to be printed on a local printer attached to the thin client or any particular printer associated with the printer queue. Instead, the routing information can also point the print ready format to a different local computer, e.g., one attached to an office mate's computer. The invention can also send a document to a computer or printer in another location, much like facsimile. Further, the PRF job can be sent directly to a printer attached to the network. As is known to those skilled in the art, a printer can be directly attached to a network with a network card having a network address, such as an Internet address. To send a print job directly to the printer, the PRF job is sent using routing information containing the printer's network address.

The invention finds particular application in a plurality of network computers coupled to one or more servers by means of an intranet. In such an arrangement, rather than the client files being stored permanently in the network computer, the server contains the client images. The client images, i.e. the software and profiles, of each client network computer are downloaded to the client network computer at logon. This client image would contain the software modules in the thin client 101 as shown in FIG. 3, but need not contain all of the printer software associated with the customary printer subsystem in a personal computer, much of which is offloaded to the server. Of course, if all printing from a client were accomplished on a network printer directly coupled to the network, the print receiver module is not needed in the client image. Thus, downloading of the client images is more efficient.

While the invention has been shown and described with reference to particular embodiments thereof, it will be understood by those skilled in the art that the invention can be practiced, with modification, in other environments. For example, although the invention described above can be conveniently implemented in a general purpose computer selectively reconfigured or activated by software, those skilled in the art would recognize that the invention could be carried out in hardware, in firmware or in any combination of software, firmware or hardware including a special purpose apparatus specifically designed to perform the described invention. Therefore, changes in form and detail may be made therein without departing from the spirit and scope of the invention as set forth in the accompanying claims.

We claim:

1. A method for local printing for a resource limited client system, comprising the steps of:

at a requesting client system, receiving a print request from a resident application for local printing;

sending the print request via a network to a print rendering server in a device independent format wherein the print request contains routing information to a printer attached to the network through a client system;

at the print rendering server, rendering the print request into a device dependent data stream;

sending the device dependent data stream across the network to the local printer; and receiving the device dependent data stream for printing at the local printer.

2. The method as recited in claim 1 wherein the print request from the resident application is received as a set of graphics API calls and the method further comprises the step of converting the graphics API calls to a device independent format at the client system.

3. The method as recited in claim 2 wherein the print request contains the print job in the device independent format, job properties, printer properties and routing information.

4. The method as recited in claim 3 wherein the routing information includes an address to a local printer attached to a client system other than the requesting client system.

5. The method as recited in claim 4 all spooling is performed at the print rendering server.

6. The method as recited in claim 1 wherein the print request sent to the print rendering server contains routing information with an address for the requesting client system so that the receiving step is performed at the requesting client system.

7. The method as recited in claim 1 further comprising the step of controlling the device dependent data stream to avoid local spooling at a receiving client system.

8. The method as recited in claim 1 wherein the client system is connected to the network by a wireless transmission means.

* * * * *